Sept. 7, 1954  N. VAN PEET  2,688,173
SEPARABLE SNAP FASTENER
Filed Sept. 17, 1951
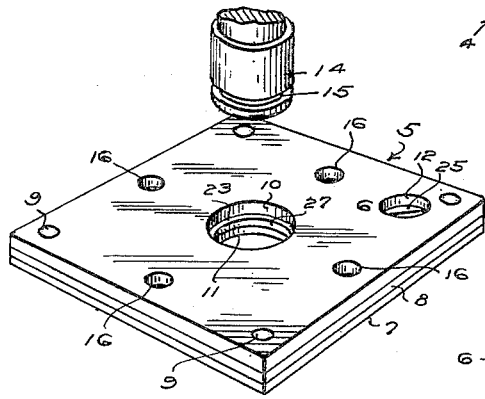
Fig.1.
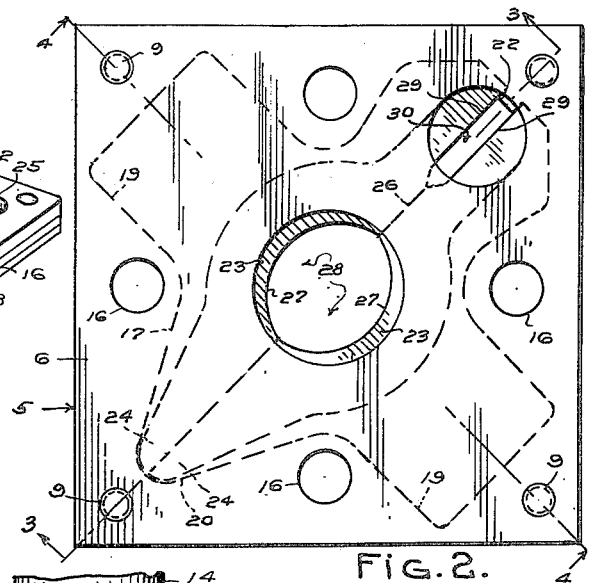
Fig.2.
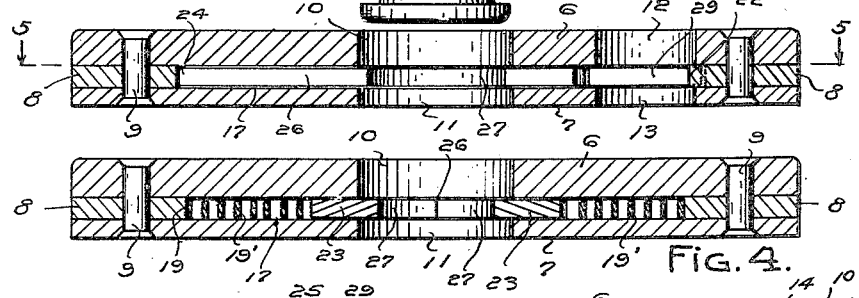
Fig.3.
Fig.4.
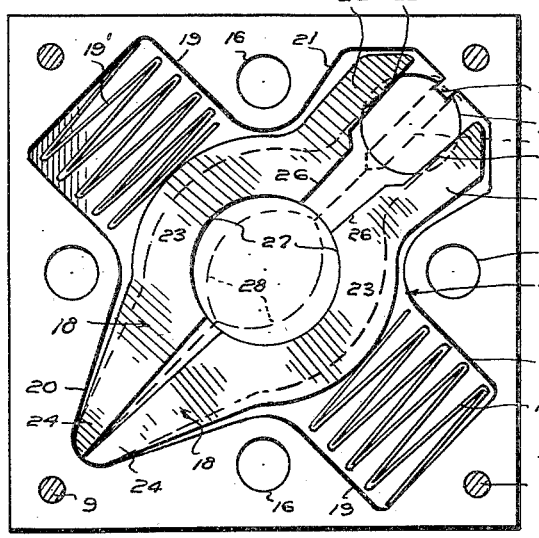
Fig.5.
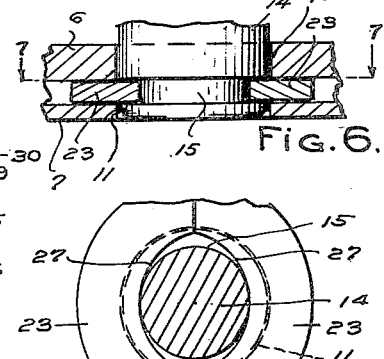
Fig.6.
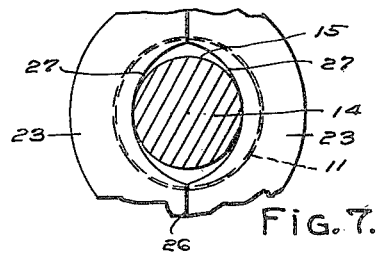
Fig.7.
INVENTOR.
NIXON VAN PEET,
BY
ATTORNEY.

Patented Sept. 7, 1954

2,688,173

UNITED STATES PATENT OFFICE 2,688,173

SEPARABLE SNAP FASTENER

Nixon Van Peet, Miami, Fla., assignor to
Nels E. Nelson, Miami, Fla.

Application September 17, 1951, Serial No. 246,921

6 Claims. (Cl. 24—211)

1

This invention relates to improvements in fastener devices and has particular reference to a quick acting and powerful fastener for use in detachably holding chairs and seats, such for instance as a means for securely retaining airplane seats in position against shifting, airplane and other cargo tie-downs and many other uses where a quick acting and readily releasable fastener is desired.

The invention contemplates a generally improved fastener device of quick acting and positive construction embodying a housing of stamped laminations that houses a pair of spring pressed clamping jaws that are actuable through an opening formed in certain of the laminations to receive and securely grip a headed stud inserted through the openings to engage the stud against accidental withdrawal through substantially an arc of 360 degrees, the device further embodying means to quickly and easily disengage the jaws from the stud for withdrawal when desired.

An important object of the invention resides in the extremely simple and compact construction of the device that adapts it for use as floor fasteners for the legs of aircraft seats or cargo tie-downs, wall brackets or the like, has few and simple parts of a nature requiring a minimum of attention, is strong, durable, cheap to manufacture and is highly efficient in use.

Other important objects and advantages of the invention will be readily apparent during the course of the following description, reference being had to the accompanying drawings, wherein has been illustrated a preferred form of the device and wherein like characters of reference are employed to denote like parts throughout.

In the drawings:

Figure 1 is a perspective view of a fastener device constructed in accordance with the invention and showing a headed stud for engagement therewith, Figure 2 is a top plan view of the fastener, Figure 3 is a diagonal vertical sectional view, taken on line 3—3 of Figure 2, Figure 4 is a similar view, taken on line 4—4 of Figure 2, Figure 5 is a horizontal section, taken on line 5—5 of Figure 3, Figure 6 is a fragmentary vertical section, through the device showing the headed stud in clamped position, and Figure 7 is a horizontal section taken on line 7—7 of Figure 6.

Referring specifically to the drawings, the numeral 5 denotes the fastener device as a whole.

2

The fastener is adapted to be secured to the floor of an aircraft either upon or recessed as may be desired, may be secured to various parts of the aircraft as tie-down fasteners for cargo or may be readily secured to walls or other places where a quick acting and readily releasable fastener is desired. The fastener embodies a housing of laminated form, comprising upper and lower flat metallic plates of identical shape and size, indicated by the numerals 6 and 7 and an intermediate plate 8 of identical area to the plates 6 and 7. The several plates at assembly are preferably riveted together, by rivets 9, as shown.

The plates 6 and 7 are stamped to provide a relatively large and centrally disposed cylindrical opening 10 and 11 that are axially and concentrically arranged and smaller cylindrical openings 12 and 13, also concentric and axially arranged and disposed adjacent one corner of the housing. The openings 10 and 11 are adapted to be traversed by a headed stud 14, grooved at 15 for the reception of a pair of clamping jaws, to be described. The stud 14 is normally fixedly attached to the lower ends of the legs of chairs, seats or the like or upon the ends of a cable or other fastening device employed in cargo tie-downs. The stud 14 has a diameter slightly smaller than the diameter of the openings 10 and 11. The openings 12 and 13 serve as sight openings to determine the position of the clamping jaws, to be described and further as access openings for the insertion of a suitable tool for the release of the clamping jaws. Each of the plates 6, 7 and 8 are stamped at identical points to provide a plurality of cylindrical and concentric openings 16 for the passage of screws, bolts, rivets or other fastening devices, through the medium of which the housing is securely mounted in position against displacement.

The intermediate plate 8 is stamped to provide a chamber 17 for the shiftable reception of a pair of identical flat metallic clamping jaws 18. The plates 6 and 7 form the upper and lower walls of the chamber 17 and the jaws have a thickness slightly less than the thickness of the plate 8 to permit shifting movement in the chamber. The housing has been shown as being substantially square in top plan and the chamber 17 and jaws 18 have been arranged diagonally of the housing, which arrangement permits of a maximum size of clamping jaw and chamber 17 with a housing of minimum size. Obviously, if the housing 5 was formed sufficiently large, the chamber 17 and jaws 18 could be arranged transversely on a center line. The chamber 17 provides oppositely arranged spring sockets 19, for the seating reception of any desirable type of leaf spring, 19'. The chamber further is provided with a tapered socket 20, rounded at its apex. Opposite to the tapered socket 20, the chamber is extended at 21, upon opposite sides of the openings 12 and 13 and provides adequate clearance for the shifting movement of the jaws 18. A stop and aligning lug bisects the openings 12 and 13, shown at 22, for a purpose to be described.

As before stated, the clamping jaws 18 are identical in shape and size and embody arcuate body portions 23, tapered fulcrum legs 24 extending from the body 23 and arms 25, extending from the opposite sides of the jaws and normally overlying the openings 12 and 13 when in clamping position. Each jaw 18 has one straight side 26 that is in normal parallel and contacting relationship with its companion jaw. The body portions of the jaws 18 are arcuately cut away at 27, upon an arc calculated to register with the openings 10 and 11 when the jaws are shifted to release position. With the jaws in the clamping position and with the straight sides in contacting relation, the arcuate openings jointly provide an oval opening 28, see particularly Figure 2. The fulcrum legs 24 are rounded at their terminal ends and jointly fulcrum in the rounded end of the socket 20 and maintain the relative positions of the openings 10 and 11 and the arcuate openings 27. The springs bear jointly between the ends of the sockets 19 and the body portions of the jaws 23. Thus, the jaws 18 are spring loaded at all times toward a clamping position. The arms 25 are cut away at 29 and their terminal ends normally bear against the stop lug 22. The stop lug 22 assures that the straight sides of the jaws will be prevented from shifting beyond the diagonal center line of the openings 10 and 11 and 12 and 13. The cut-away 29 further provides a slot 30, see Figure 2, when the jaws are in normal contacting or clamping position and permits the insertion of a screw driver or other tool into the slot 30 and by twisting, shifts the jaws to release position, shown in Figure 5. Since the slot 30 bisects the opening 12 on the diagonal center line, it provides a visual indication of the clamping position of the jaws.

In the use of the device, the fastener having been firmly secured to a floor or other place of use by screws or the like, an article of furniture, such for instance, the seat structures of aircraft having the headed studs fixed upon the ends of the legs, is positioned over the fasteners, with the studs in registery with the openings 10. Downward pressure on the seat structure will cause the stud to force the jaws 18 apart until the groove 15 registers with the jaws, at which time the jaws will snap inwardly to seating engagement within the groove 15 under the influence of the springs 19'. In the full clamping position, the straight edges of the jaws 18 will be in contact and the arms 25 in abutting engagement with the lug 22. The jaws are thus compelled to exert an equal clamping engagement in the groove 15 of the stud 14 and offer a calculated resistance against vertical movement of the stud through substantially the entire 360 degrees. Two or more of the fastening devices may be arranged for the legs of the seats as may be found desirable. After the seat has been clamped in position, the operator inspects each fastener through the opening 12 to determine whether or not the jaws are in fully clamped position, this being determined by the slot 30 formed by the arms 25. When it is desired to remove the seats, the operator inserts a screw driver or suitable key device into the slot 30 and turns it one-quarter turn, forcing the arms 25 apart and shifting the body of the jaws 18 outwardly against the tension of the springs 19' to the position shown in full lines in Figure 5. The stud 14 may then be withdrawn and the key or screw driver removed, permitting the jaws to again assume their normal contacting relation. As cargo tie-downs, the fastener devices may be positioned in any desirable place in the aircraft, the operation thereof being identical in each instance. With the spring loaded jaws, withdrawal of the stud is prevented under all normal pressures and most abnormal pressures.

It will be apparent from the foregoing, that a very simple and highly efficient fastener device has been provided that will adapt itself to many uses. The parts may be readily stamped from suitable metal plates and assembled with a minimum of effort. The jaws 18 are fulcrumed in a manner to avoid pivotal pins or the like and will be self aligning at all times to insure of a perfect 360 degree clamping action upon the well known grooved stud. The upper and lower plates 6 and 7 may be made of identical thickness whereby the fastener may be used from either side with equal effect. The assembly of the device requires no mechanical actions other than the rivets which maintain the laminations together.

It is to be understood, that while a preferred form of the fastener has been shown, various changes may be resorted to as reasonably fall within the spirit of the invention or the scope of the subjoined claims.

Having described my invention, what I claim as new and desire to secure by Letters Patent is:

1. A reversible type fastener device of the character described for clamping engagement with a stud having a circumferential groove, the fastener comprising a housing formed of a plurality of flat laminations riveted together, the housing provided with a centrally positioned stud receiving opening entirely therethrough and a spaced apart sight and release opening, one of the laminations cut away to provide a chamber, a pair of floating spring loaded clamping jaws shiftably mounted in the chamber in opposed relation to partially underlie the stud receiving opening, companion ends of the jaws being tapered to fulcrum in a tapered socket formed by the chamber, the opposite companion ends of the jaws underlying the release opening, the last named ends being cut away to jointly provide a key slot for the reception of a key to spread the ends apart to release a stud clamped in the central opening.

2. A reversible type fastener device of the character described for detachable clamping engagement with a stud having a circumferential groove, the fastener comprising a housing formed of a plurality of flat metallic laminations riveted together, the housing provided with a centrally arranged stud receiving opening entirely therethrough and a spaced apart sight and release opening, the several laminations being stamped and provided with a plurality of openings for the reception of attaching screws, an intermediate lamination being stamped to provide a relatively shallow flat chamber, flat identical clamping jaws shiftably and floatably mounted in the chamber in opposed relation, springs engaging each of the jaws to shift them together, the jaws partially extending into the stud receiving opening and lying within the path of movement of a stud inserted through the opening from either side of the housing, one companion end of each jaw being tapered and rounded to have a floating fulcrum engagement in a tapered socket formed in the chamber, the jaws shiftable toward and from each other on the fulcrum ends, the opposite companion ends of the jaws underlying the sight and release opening, the last named ends being cut away to jointly provide a key slot that bisects the sight and release opening, stop means for limiting the shifting of the jaws under the action of the springs to accurately position the jaws with respect to the stud receiving opening, the jaws being shiftable apart against the tension of the springs by the insertion of a stud through the stud receiving opening.

3. A reversible type fastening device of the character described for clamping engagement with an inserted stud having a grooved head, the device embodying a housing that consists of upper and lower and an intermediate flat metallic laminations riveted together, the upper and lower laminations being provided with concentric and centrally arranged stud receiving openings and concentric spaced apart sight and release openings, the intermediate lamination being stamped to form a relatively shallow flat chamber for the reception of stud clamping mechanism, the chamber providing oppositely disposed spring sockets and a tapered fulcrum socket, a pair of flat and identical clamping jaws floatably disposed in the chamber in partial bisecting relation to the stud receiving openings, the jaws being in opposed relation and independently spring pressed toward each other, opposed edges of the jaws being arcuately cut away to jointly form an eccentric opening with respect to the stud receiving opening, each of the jaws provided with a companion leg that has fulcrum engagement in the fulcrum socket, oppositely extending and companion arms formed on the jaws that underlie the sight and release opening, the opposed edge of the arms being cut away to jointly provide a key slot that bisects the sight and release opening and a stop shoulder formed by the intermediate lamination to limit the shifting movement of the jaws under the action of their respective springs.

4. A reversible quick acting fastener that is square in top plan and consists of a housing formed of top, bottom and an intermediate lamination stamped from sheet metal and with the laminations riveted together adjacent their corners, the top and bottom laminations provided with centrally disposed and concentric stud receiving openings and spaced apart concentric sight and release openings, the sight openings being disposed on a diagonal center line of the housing, the several laminations being provided with equidistantly spaced and concentric openings for the reception of screw fastening devices, the intermediate lamination being cut away to provide an operating chamber having a pair of oppositely disposed spring sockets, a tapered fulcrum socket and a socket for the shiftable reception of clamping jaw arms, the top and bottom walls of the chamber being formed by the outer laminations and with the walls being flat and parallel, a pair of identical flat clamping jaws shiftable and floatably supported in the chamber, the jaws being separately spring loaded for movement toward each other to abutting relation, the abutting edges of the jaws being straight with each straight edge identically cut away on an arc to jointly provide an oval opening that underlies the stud receiving opening, the jaws provided with identical tapered legs that have fulcrum engagement jointly in the fulcrum socket, the jaws provided with identical oppositely extending arms that underlie the sight and release opening, the opposed edges of the arms cut away to jointly provide a key slot for the reception of a key to spread the arms and jaws apart to release a stud that is held in clamping engagement in the stud receiving opening, stop means carried by the intermediate lamination to limit the shifting movement of the jaws under the action of their respective springs, the clamping jaws being arranged on the diagonal center line of the stud and sight opening.

5. The structure as recited in claim 3, wherein the end of the fulcrum socket is rounded for the reception of rounded corners formed on the terminal ends of the fulcrum legs, the arcuate cut-outs of the jaws being on the same arc as the stud receiving opening whereby the arcuate cut-outs of the jaws will lie in concentric registry with the stud receiving opening when the jaws are shifted apart by being traversed by a stud.

6. A reversible fastener device in the form of a flat square housing comprising an inner lamination and outer companion laminations rigidly connected upon opposite sides of the inner lamination in face to face abutting relation, the outer laminations being identically centrally and concentrically apertured, the outer laminations being further apertured concentrically and at a point outwardly of the first named apertures and diagonally of the square housing, the inner lamination being cut away to form a relatively shallow flat chamber having flat parallel top and bottom walls formed by the outer laminations, a pair of flat spring loaded jaws shiftably mounted in the chamber in opposed relation, the jaws being floatingly fulcrumed in the chamber with each jaw being positively stopped against shifting past a diagonal center line of the fastener, an individual compression spring for each of the jaws, the jaws cut away on their opposed edges to jointly form a cylindrical stud receiving opening, the jaws in normal abutting relation simultaneously partially underlying the centrally arranged apertures and in the path of a headed stud to be inserted through the openings for snapping and interlocking engagement with the jaws, the fastener being identical in shape and size upon either side, the jaws extending beneath the second named openings with their opposed ends slightly separated to form a key opening that bisects the second named openings and is visible therethrough, the several laminations provided with spaced apart concentric openings for the passage of mounting devices.

References Cited in the file of this patent

UNITED STATES PATENTS

| Number | Name | Date |
|---|---|---|
| 182,861 | Schnopp | Oct. 3, 1876 |
| 1,326,543 | Stenman | Dec. 30, 1919 |
| 1,853,025 | Anderson | Apr. 12, 1932 |
| 2,420,060 | Adams | May 6, 1947 |
| 2,464,414 | Pensabene | Mar. 15, 1949 |